US011645912B2

(12) United States Patent
Lau et al.

(10) Patent No.: US 11,645,912 B2
(45) Date of Patent: May 9, 2023

(54) COOPERATIVE INTELLIGENT TRAFFIC SYSTEM COMMUNICATION BETWEEN BICYCLES

(71) Applicants: AT&T INTELLECTUAL PROPERTY I, L.P., Atlanta, GA (US); AT&T Mobility II LLC, Atlanta, GA (US)

(72) Inventors: Erie Lai Har Lau, Redmond, WA (US); Julius Mueller, East Palo Alto, CA (US); Charles Carey, Kirkland, WA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 17/477,817

(22) Filed: Sep. 17, 2021

(65) Prior Publication Data
US 2022/0005355 A1 Jan. 6, 2022

Related U.S. Application Data

(63) Continuation of application No. 16/382,401, filed on Apr. 12, 2019, now Pat. No. 11,151,877, which is a (Continued)

(51) Int. Cl.
*G08G 1/16* (2006.01)
*G06K 9/00* (2022.01)
(Continued)

(52) U.S. Cl.
CPC ............ *G08G 1/162* (2013.01); *G06V 20/20* (2022.01); *G06V 20/58* (2022.01); *G08G 1/166* (2013.01);
(Continued)

(58) Field of Classification Search
CPC ......... G08G 1/162; G08G 1/166; H04W 4/46; H04W 4/023; G06K 9/00671; G06K 9/00805; G08B 21/0438
See application file for complete search history.

(56) References Cited

U.S. PATENT DOCUMENTS

| 8,509,693 | B2 | 8/2013 | Pinder et al. |
| 8,666,647 | B2 | 3/2014 | Kumabe |

(Continued)

FOREIGN PATENT DOCUMENTS

| CN | 102256207 A | 11/2011 |
| CN | 101408433 B | 7/2012 |

(Continued)

OTHER PUBLICATIONS

U.S. Appl. No. 16/382,401, filed Apr. 12, 2019.
(Continued)

*Primary Examiner* — Thomas D Alunkal
(74) *Attorney, Agent, or Firm* — Amin, Turocy & Watson, LLP

(57) ABSTRACT

A cooperative intelligent traffic system is provided for use between bicycles, motorcycles, and other vehicles. Sensor data from mobile devices and other sensor devices associated with the vehicle can be sent to an edge network computing device (e.g., a multi-access edge computing device) and be processed at the edge network to identify threats and hazards, and then transmit the threat assessment data to other bicycles, motorcycles, and vehicles nearby. The threat assessment data can be used by the operators of the other vehicles to warn them of upcoming threats, hazards, road conditions, and other pertinent conditions.

20 Claims, 11 Drawing Sheets

Related U.S. Application Data continuation of application No. 15/963,964, filed on Apr. 26, 2018, now Pat. No. 10,304,338.

(51) Int. Cl.

| | | |
|---|---|---|
| *H04W 4/46* | (2018.01) | |
| *H04W 4/02* | (2018.01) | |
| *H04W 4/44* | (2018.01) | |
| *H04W 4/38* | (2018.01) | |
| *H04W 4/90* | (2018.01) | |
| *G06V 20/20* | (2022.01) | |
| *G06V 20/58* | (2022.01) | |

(52) U.S. Cl.
CPC ............ *H04W 4/023* (2013.01); *H04W 4/38* (2018.02); *H04W 4/44* (2018.02); *H04W 4/46* (2018.02); *H04W 4/90* (2018.02)

(56) References Cited

U.S. PATENT DOCUMENTS

| | | | |
|---|---|---|---|
| 8,855,835 | B2 | 10/2014 | Kumabe |
| 9,132,773 | B2 | 9/2015 | Washlow et al. |
| 9,511,730 | B1* | 12/2016 | Wu .......................... G08G 1/166 |
| 9,608,956 | B2 | 3/2017 | Sawato |
| 9,665,102 | B2 | 5/2017 | Switkes et al. |
| 9,827,811 | B1* | 11/2017 | McNew .................... B60N 2/90 |
| 10,019,904 | B1* | 7/2018 | Chan .................. G06Q 10/0635 |
| 10,304,338 | B1 | 5/2019 | Lau et al. |
| 2003/0201884 | A1* | 10/2003 | Perez ..................... B60Q 1/444 340/467 |
| 2014/0118128 | A1* | 5/2014 | Orzeck ...................... B62J 6/16 340/432 |
| 2015/0179066 | A1* | 6/2015 | Rider ........................ G08G 1/04 701/31.5 |
| 2015/0228066 | A1* | 8/2015 | Farb ....................... G06V 20/58 348/148 |
| 2015/0251599 | A1* | 9/2015 | Koravadi ................ G01S 19/42 340/903 |
| 2016/0362048 | A1 | 12/2016 | Matthews et al. |
| 2016/0366598 | A1 | 12/2016 | Gallagher |
| 2017/0109992 | A1* | 4/2017 | Lin .................... G08B 21/0438 |
| 2017/0178514 | A1 | 6/2017 | Dry |
| 2017/0221362 | A1* | 8/2017 | Gunaratne ............. G08G 1/166 |
| 2017/0278312 | A1 | 9/2017 | Minster et al. |
| 2017/0318360 | A1 | 11/2017 | Tran et al. |
| 2017/0334522 | A1* | 11/2017 | Zahid ................... H04W 4/029 |
| 2018/0018840 | A1 | 1/2018 | Xia et al. |

FOREIGN PATENT DOCUMENTS

| | | |
|---|---|---|
| CN | 104154920 B | 5/2017 |
| DE | 10 2006 008 087 A1 | 9/2007 |
| JP | H10-293899 A | 11/1998 |
| JP | 2000-348300 A | 12/2000 |
| JP | 2009-277059 A | 11/2009 |
| JP | 2010-057015 A | 3/2010 |
| JP | 2010-213044 A | 9/2010 |
| WO | 00/26883 A2 | 5/2000 |
| WO | 2018/111177 A1 | 6/2018 |
| WO | 2018/125686 A2 | 7/2018 |

OTHER PUBLICATIONS

U.S. Appl. No. 15/963,964, filed Apr. 26, 2018.
Non-Final Office Action received for U.S. Appl. No. 15/963,964 dated Aug. 27, 2018, 25 pages.
Lee et al., "Internet of Vehicles: From intelligent grid to autonomous cars and vehicular fogs", URL: http://journals.sagepub.com/doi/pdf/10.1177/1550147716665500, International Journal of Distributed Sensor Networks vol. 12, No. 9, 2016, pp. 1-14.
Gerla et al., "Internet of Vehicles: From Intelligent Grid to Autonomous Cars and Vehicular Clouds", URL: http://koasas.kaist.ac.kr/bitstream /10203/187604/1/81 062.pdf, IEEE World Forum on Internet of Things (WF-IoT), 2014, pp. 241-246.
Malladi et al., "WIFI For Vehicular Communication Systems", URL: http://www.jetir.org/papers/JETIR1506045.pdf, Journal of Emerging Technologies and Innovative Research (JETIR), vol. 2, No. 6, Jun. 2015, pp. 1939-1943.
Looy, Patrick van, "Towards Cloud-based Vehicular Networks", URL: http://referaat.cs.utwente.nl/conference/25/paper/7577/towards-cloud-based-vehicular-networks.pdf, 25th Twente Student Conference on IT, Jul. 1, 2016, 9 pages.
Mau et al., "Vehicular Inter-Networking via Named Data—An OPNET Simulation Study", URL: https://pdfs.semanticscholar.org/a450/8929bbcea53bf0ee29aff0a06ab9896caed4.pdf, Institute for Computer Sciences, Social Informatics and Telecommunications Engineering, TridentCom, LNICST, vol. 137, 2014, pp. 116-125.
Bennet, Amy, "Chain reaction: USA cycling and IBM Watson IoT", Internet of Things blog, Jun. 15, 2016, 7 pages.
"SAP Moves Into Smart Cycling Products", Bike Europe, Apr. 6, 2017, 3 pages.
"The Connected Bicycle Solution That's Making our Cities Smarter", GSMA, Sep. 4, 2017, 6 pages.
Non-Final Office Action received for U.S. Appl. No. 16/382,401 dated May 28, 2020, 50 pages.
Final Office Action received for U.S. Appl. No. 16/382,401 dated Nov. 23, 2020, 48 pages.
Non-Final Office Action received for U.S. Appl. No. 16/382,401 dated Mar. 2, 2021, 57 pages.

* cited by examiner

COOPERATIVE INTELLIGENT TRAFFIC SYSTEM COMMUNICATION BETWEEN BICYCLES

RELATED APPLICATIONS

The subject patent application is a continuation of, and claims priority to each of, U.S. patent application Ser. No. 16/382,401 (now U.S. Pat. No. 11,151,877), filed Apr. 12, 2019, and entitled "COOPERATIVE INTELLIGENT TRAFFIC SYSTEM COMMUNICATION BETWEEN BICYCLES," which is a continuation of U.S. patent application Ser. No. 15/963,964 (now U.S. Pat. No. 10,304,338), filed Apr. 26, 2018, and entitled "COOPERATIVE INTELLIGENT TRAFFIC SYSTEM COMMUNICATION BETWEEN BICYCLES," the entireties of which applications are hereby incorporated by reference herein.

TECHNICAL FIELD

The present application relates generally to the field of mobile communications and, more specifically, to enabling a cooperative intelligent traffic control system between vehicles using multi-access edge computing sensor data from a wireless device associated with a bicycle device.

BACKGROUND

Motorcycling and bicycling can be risky forms of transportation, especially when traveling in groups due to limited visibility of the road ahead. Connected car solutions cannot be ported easily to these bikes because they have limited cabin space to mount/store advanced sensors.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
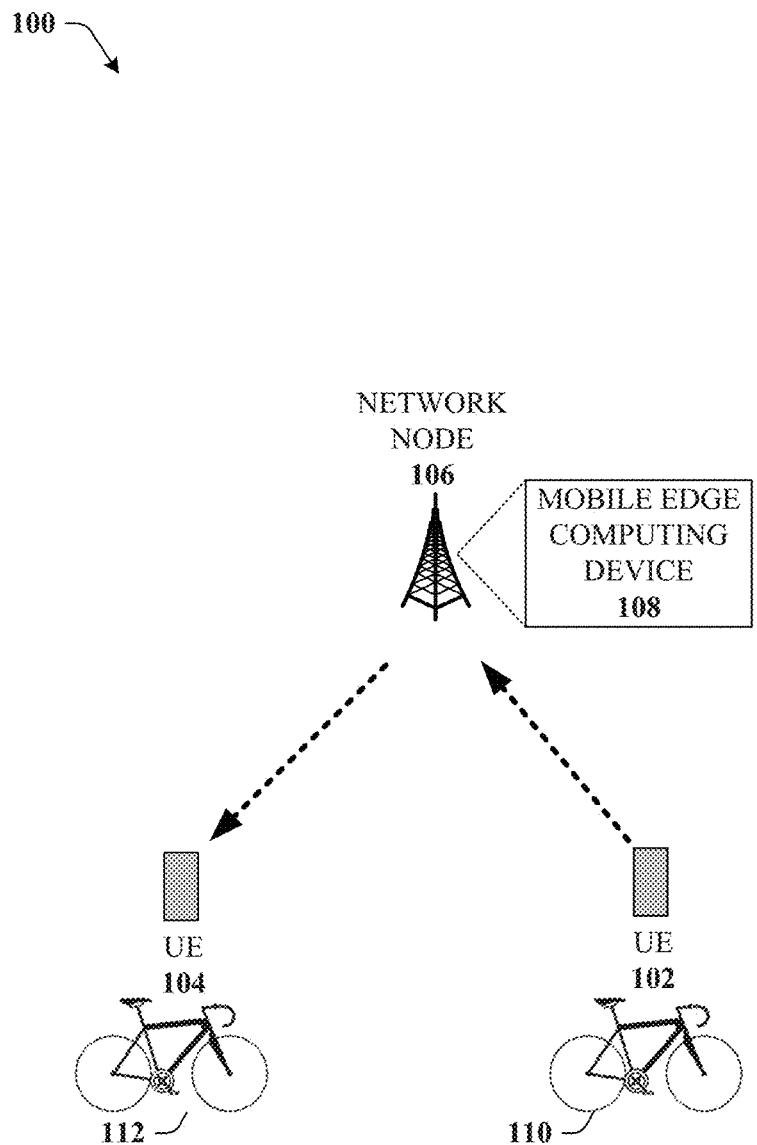
FIG. 1 illustrates an example cooperative intelligent traffic system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a cooperative intelligent traffic system between bicycles, motorcycles, and other vehicles. Sensor data from mobile devices and other sensor devices associated with the vehicle can be sent to an edge network computing device (e.g., a multi-access edge computing device) and be processed at the edge network to identify threats, hazards or performance recommendations (speed, heartrate, pulse, cadence), and then transmit the threat assessment data to other bicycles, motorcycles, and vehicles nearby. The threat assessment data can be used by the operators of the other vehicles to warn them of upcoming threats, hazards, road conditions, and other pertinent conditions.

By performing the processing at the edge of the network and instead of having cloud servers perform the processing, the latency can be reduced, offering much faster notifications of conditions to trailing vehicles. Offloading of processing achieves resource savings for energy-constraint two-wheeled vehicles such as bikes. For bicycles that traveling in a group, a one or two second lag time between the sensor device at the front of the pack sending the sensor data to the cloud server, and then a trailing bicycle from getting the warning would be too long. Instead, by performing the processing at the edge network, via a multi-access edge computing device, the latency can be massively reduced by critical milliseconds, enabling a trailing bicycle to have enough warning to dodge the hazard or perform some other safety maneuver.

Any sensor integration can involve different limitations. Cars have relatively unlimited electrical power, and cars have places that are protected from the elements. Bikes a strong platforms for sufficient battery power, but need everything to be waterproofed. Pedestrians need things as light and small as possible. Kickscooters, such as the foot powered models from companies like Razor, fall somewhere between bikes and pedestrians, but need more resilience than either bikes or pedestrians.

One advantage of these progressively smaller and slower platforms is that the sensors can provide useful metrics even if the accuracy diminishes with size. Bikes don't need 100 kph (60 mph) speed sensors. Pedestrians don't need 30 kph (20 mph) speed sensors. Bikes and pedestrians don't need to detect fixed objects 100 yards away. Essentially, vehicle-to-vehicle sensor platforms designed for cars and trucks are not appropriate for pedestrians, although they can share information with the bicycle based sensors Common smartphones, smart watches, Augmented Reality Goggles (so the rider can still see), etc. are able to improve how Smart Bike information is fed to the bike riders. However, a wide variety of visual or tactile devices can relay the smart bike results to the bike rider. Existing bicycle computers (speedometer/cadence/time/distance/Odometer/Stopwatch) could also display Smart Bike instructions for avoiding trouble or improving efficiency. This innovation will quantify what is today only visible to the trained observer, and relay those metrics and deduced conclusions to other Smart Bike Riders in a time frame that provides each Smart Bike Rider to take advantage of that information. When Bike A has a flat tire, maybe Bike B can hear the tire pop, but Bike D, E, F, G, H, etc. will likely not hear the pop, but could still avoid the rapidly stopping Bike A. A startling example is during races like the Tour de France, while sprinting to the day's finish, dozens might hit the pavement because of one Bike's failure. A collection of Smart Bikes could steer or brake to avoid a bloody tangle of bodies and bikes. How the riders receive redirections is obvious when common electronic gadgets are considered. We can expand the scope of the innovation to connecting Bikes AND Pedestrians AND Skateboarders AND Scooters AND etc. These additional agents of change could be instrumented by a smartphone or a smart watch. Then their location and activity information become more inputs to the real time management system While reference is generally made throughout the disclosure to an uplink data transmissions, in other embodiments, the principles disclosed herein can apply to downlink transmissions as well.

In various embodiments, a network device can comprise a processor and a memory that stores executable instructions that, when executed by the processor facilitate performance of operations. The operations can comprise receiving, by the network device of a radio access network, sensor data from a first wireless device associated with a first bicycle. The operations can also comprise identifying, by the network device, threat assessment data associated with a hazard to a second bicycle trailing the first bicycle based on the sensor data. The operations can also comprise transmitting, by the network device, the threat assessment data to a second wireless device associated with the second bicycle.

In another embodiment, method comprises receiving, by an edge network device comprising a processor, sensor data from a sensor device attached to a first bicycle, wherein the sensor device comprises an accelerometer that measures an acceleration of the first bicycle. The method can also comprise determining, by the edge network device, hazard data based on the sensor data, wherein the hazard data comprises information about a presence of a hazard that is determined based on an acceleration of the first bicycle above a defined acceleration. The method can also comprise transmitting, by the edge network device, the hazard data to a mobile device associated with a second bicycle, wherein the hazard data is configured to alert a rider of the second bicycle to the presence of the hazard.

In another embodiment, a machine-readable storage medium, comprising executable instructions that, when executed by a processor of an edge network device, facilitate performance of operations. The operations can comprise receiving sensor data and location data from a first mobile device associated with a first bicycle, wherein the first mobile device comprises an accelerometer that measures an acceleration of the first bicycle. The operations can also comprise determining a location of a road obstruction based on the location data and based on the acceleration of the first mobile device being determined to be above a defined acceleration. The operations can also comprise transmitting road obstruction data to a second mobile device associated with a second bicycle, wherein the road obstruction data is representative of an alert to a rider of the second bicycle of the location of the road obstruction.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example cooperative intelligent traffic system 100 in accordance with various aspects and embodiments of the subject disclosure. In system 100, a UE device 102 associated with a bicycle 110 can send sensor data to a multi-access edge computing device 108 associated with a network node 106. The multi-access edge computing device 108 can analyze the sensor data and send the results of the analysis to UE 104 associated with bicycle 112.

In an embodiment, the multi-access edge computing device 108 can be a hardware device housed at or near the network node 106. In other embodiments, the multi-access edge computing device 108 can be a virtual machine instantiated at one or more computers at the network node 106 and be configured to analyze the sensor data and provide threat analysis feedback and other data to the UE 104.

Multi-access edge computing (MEC) is a network architecture concept that enables cloud computing capabilities and an IT service environment at the edge of the cellular network. The basic idea behind MEC is that by running applications and performing related processing tasks closer to the cellular customer, core network data traffic is reduced and applications respond faster due to the reduced physical distance between client and server, and energy can be saved eventually by offloading processing into the cloud but adding additional communication overhead and latency to the communication. MEC technology is designed to be implemented between cellular base stations and the mobile core network, and enables flexible and rapid deployment of new applications and services for customers. Combining elements of information technology and telecommunications networking, MEC also allows cellular operators to open their radio access network (RAN) to authorized third-parties, such as application developers and content providers.

The reduced latency of MEC is particularly useful in the case of the intelligent traffic system 100 in that feedback and analysis based on sensor data received from the UE 102 can very quickly be forwarded to UE 104, allowing the operator of the bicycle 112 to respond to the analysis.

In an embodiment, UE 102 and UE 104 can be mounted on the respective bicycles 110 and 112, or can be in the pockets or otherwise mounted/and/or attached to the riders of the bicycles 110 and 112. In some various embodiments, the UE 102 and 104 can be mobile phones or can be dedicated, specialized devices operable for the intelligent traffic system 100. The UEs can be different devices as well, where UE 102 could comprise one or more sensor devices and UE 104 could be a display device or other device configured to provide feedback, notifications, alerts, and information to the rider of the bicycle 112. In some embodiments, UE 104 could be an augmented reality device that can provide alerts and information to the rider. As an example, the UE 104 could be a glasses, goggles, smart watches, smart clothes, or other device integrated into a wearable form factor or in to a helmet that can provide a heads up display (HUD) for the rider alerting them of road hazards, planned maneuvers and other information via the HUD. Road obstacles, hazards, and other determined threats can be displayed on the HUD of the rider of the bicycle 112 as an augmented reality display, enabling the rider to see where the obstacles and hazards are even though they may not actually be visible to the rider as of yet. The UE 104 can also provide audible alerts or information based on the analysis performed by the MEC device 108.

In an embodiment, the UE 102 and 104 can communicate with the network node via cellular (e.g., 3G, 4G, 5G, etc.), Wi-Fi, WiMax, or other wireless communications protocol. In an embodiment, the wireless communication protocol can be ultra-reliable and low latency (URLLC) communication for reduced latency, and in other embodiments can be enhanced Mobile Broadband data (eMBB) or massive Machine Type Communications (mMTC).

It is to be appreciated that while bicycles are shown in FIG. 1, and described here and elsewhere in the detailed description, in other embodiments, other vehicles, cars, motorcycles, are possible. The principles disclosed herein can also apply to pedestrians holding mobile devices and other devices suitable for collecting sensor data and transmitting the sensor data to the MEC device 108 via the network node 106 and receiving threat assessment analysis data back from the MEC device 108.

Figure 2:
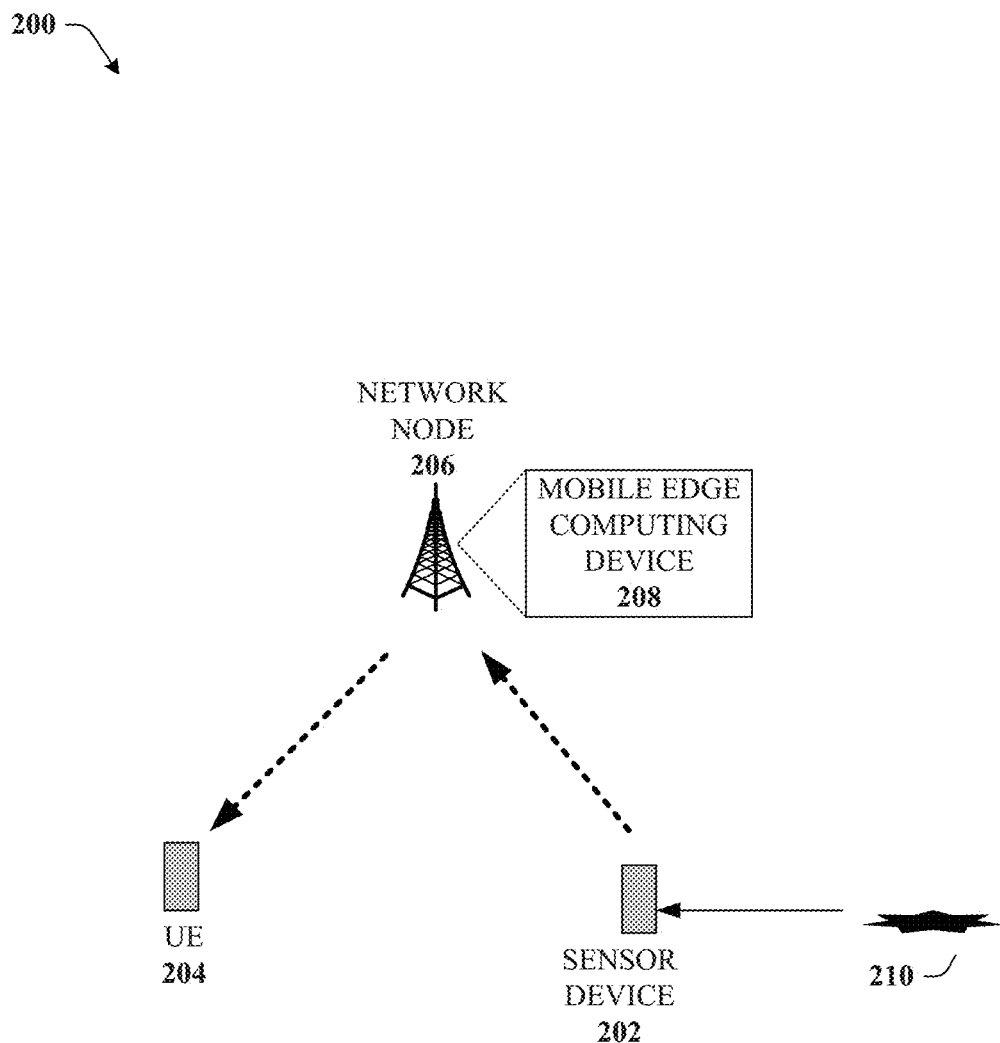
FIG. 2 illustrates an example cooperative intelligent traffic system in accordance with various aspects and embodiments of the subject disclosure.

Turning now to FIG. 2, illustrated is an example cooperative intelligent traffic system 200 in accordance with various aspects and embodiments of the subject disclosure. In system 200, a sensor device 202 associated with a bicycle or other vehicle can send sensor data to a multi-access edge computing device 208 associated with a network node 206. The multi-access edge computing device 208 can analyze the sensor data and send the results of the analysis to UE 204 associated with another bicycle or vehicle.

The sensor device 202 can be a mobile phone or other device equipped with one or more sensors. In some embodiments, the sensor device 202 can be communicably coupled to a mobile device that transmits the sensor data to the MEC device 208 via the network node 206. In some embodiments, the sensor device 202 can be mounted on the bicycle, worn by the rider of the bicycle, or otherwise mounted on or carried by the rider.

The sensor device 202 can determine the existence of a road obstruction or hazard 210 using one or more sensing mechanisms. The sensor data about the hazard 210 can be sent to the MEC device 208 which analyzes the data in order to determine a threat assessment or determine whether an alert should be sent to UE 204. The assessment or alert data can be sent to UE 204 which enables the rider operating the bicycle associated with UE 204 to dodge, avoid, or otherwise be alerted to the presence of hazard 210.

The sensor device 202 can include one or more accelerometers that determine the location of the hazard 210 based on detecting sudden changes in movement, either side to side, or braking, or accelerating, and send the accelerometer data to the MEC device 208. The MEC device 208 can determine the level of threat based on the acceleration levels. For instance, if the acceleration is above a predetermined threshold, the MEC device 208 can determine that a threat exists, and send an alert to the UE 204.

The sensor device 202 can also include cameras, optical or wireless rangefinders, speedometers, rotary encoders, microphones, GPS devices, and other sensing devices to capture varying sensor data which can be used by the MEC device 208 to determine the existence and nature of the hazard 210. The MEC device 208 can use a plurality of the sensing data to determine the existence, extent, and seriousness of the hazard 210.

For example, sensor device 202 can detect movement as if the bicycle were dodging an obstruction, (e.g., pothole, curb, pedestrian, fallen bicycle, etc.). During this period, a camera device on the sensor device 202 can also be recording video of the event, which is streamed to the MEC device 208. The MEC device 208 can perform image analysis to try and recognize whether there is an obstruction, what type, and then provide the appropriate feedback to the UE 204. If the sensor device 202 detects a movement, but then the MEC device 208 does not recognize any road obstruction, the MEC device 208 may determine not to send any alert to the UE 204. In other embodiments, it may send an alert or notification that is a weak alert. If an object is recognized as an obstruction, the alert or notification can be a strong alert. Weak alerts and strong alerts can be color coded, different pitches, shapes, or have other variations to alert the rider associated with UE 204 to the confidence of the alert or notification.

The multi-access edge computing device 208 can determine the location of the sensor device 202 based on either network location services or based on GPS data received from the sensor device in order to plot and/or otherwise record the location of the hazard 210. The location can be used to superimpose the hazard on an augmented reality display associated with UE 204 to provide the rider with a view of where the hazard is. The location can also be used to select the UE 204 from among a group of UEs. For instance, if there are multiple bicycles trailing the first bicycle associated with the sensor device 202, but they are spread out, the MEC device 208 can determine the location of the hazard and the location and traveling direction of the other bicycles (via their respective UEs) and then select to which UE to send the alert based on the relevance of the alert to each UE device. For example, if the UE 204 is trailing directly behind the sensor device 202, then the alert for the hazard 210 is particularly relevant, but if another UE, also trailing behind, but some distance to the side of the sensor device 202, may not require the warning. The selection of which devices have alerts sent to them by the MEC device 208 can thus be a function of the location of the hazard 210, the size of the hazard 210 (as determined by a camera or other sensor on the sensor device 210), and the location and traveling direction of the other UEs.

The MEC device 208 can also determine to send data to UE 204 based on group selection data associated with the UE 204. In an embodiment, the riders of the first bicycle associated with sensor device 202 and the second bicycle associated with UE 204 can be members of a group (e.g., a riding team, friends, etc.) and elect to share data with each other to improve the safety of the ride. The group selection can be made before the ride has started or during the ride. In other embodiments, the MEC device 208 can determine to share data based on the proximity of the devices to each other. As an example, even if the bicyclists are not members of a group, but are otherwise riding near each other, the MEC device 208 can determine the distance between the riders, and if it is less than a predetermined distance, the MEC device 208 can automatically determine to share the data from the sensor device 202 with the UE 204. The proximity cutoff can be selected by either or both of the riders of UE 204 and sensor device 202, or based on preference information associated with identity profiles of each device, or based on the speed of the devices. For instance, if the bicycles are traveling at a fast speed, the proximity can be larger so that the threat assessment can be provided with enough time for the rider to react and avoid the hazard 210.

In an embodiment, both UE 204 and sensor device 202 can be configured to send sensor feedback to the MEC device 208 and receive the threat assessment data from the MEC 208. In other embodiments, UE 204 may only be configured to receive the threat assessment data from the MEC device 208 and may not be equipped to collect and/or send sensor data, or the rider may not wish to share sensor data with the MEC device 208. In such an embodiment, the MEC device 208 can then send localized advertisements to UE 204 to make up for the lack of ability to share sensor data. The advertisements can be displayed via video or images, on an augmented reality display, or be audible advertisements.

Figure 3:
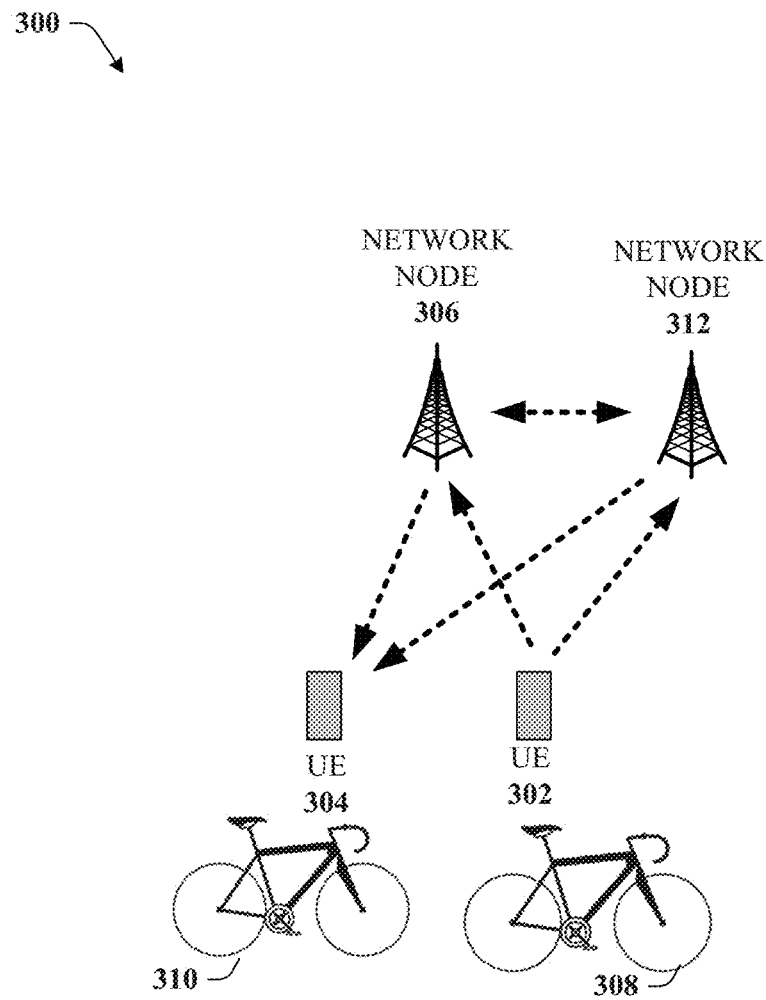
FIG. 3 illustrates an example cooperative intelligent traffic system in accordance with various aspects and embodiments of the subject disclosure.

Turning now to FIG. 3, illustrated is an example cooperative intelligent traffic system 300 in accordance with various aspects and embodiments of the subject disclosure. In system 300, a UE device 302 associated with bicycle 308 or other vehicle can send sensor data to a network node 306. The network node 306 can analyze the sensor data and send the results of the analysis to UE 304 associated with bicycle 310 or other vehicle.

In an embodiment, the network node 306 and network node 312 can have defined cell areas of service and as the bicycle 308 moves from one cell area (e.g., associated with network node 306) to another cell area (e.g., associated with network node 312), the UE 302 can switch from transmitting the sensor data from network node 306 to network node 312. When the switch happens, a multi-access edge computing device instantiated at network node 312 can begin processing the sensor data for consumption by the UE 304 associated with bicycle 310. If the UE 304 is within range of network node 312, network node 312 can transmit the threat assessment data to the UE 304. If, in another embodiment, the UE 304 is not yet within range of network node 312, the network node 312 can use a backhaul network to transmit the threat assessment data and other results of the sensor data processing to network node 306 for transmission to UE 304.

Figure 4:
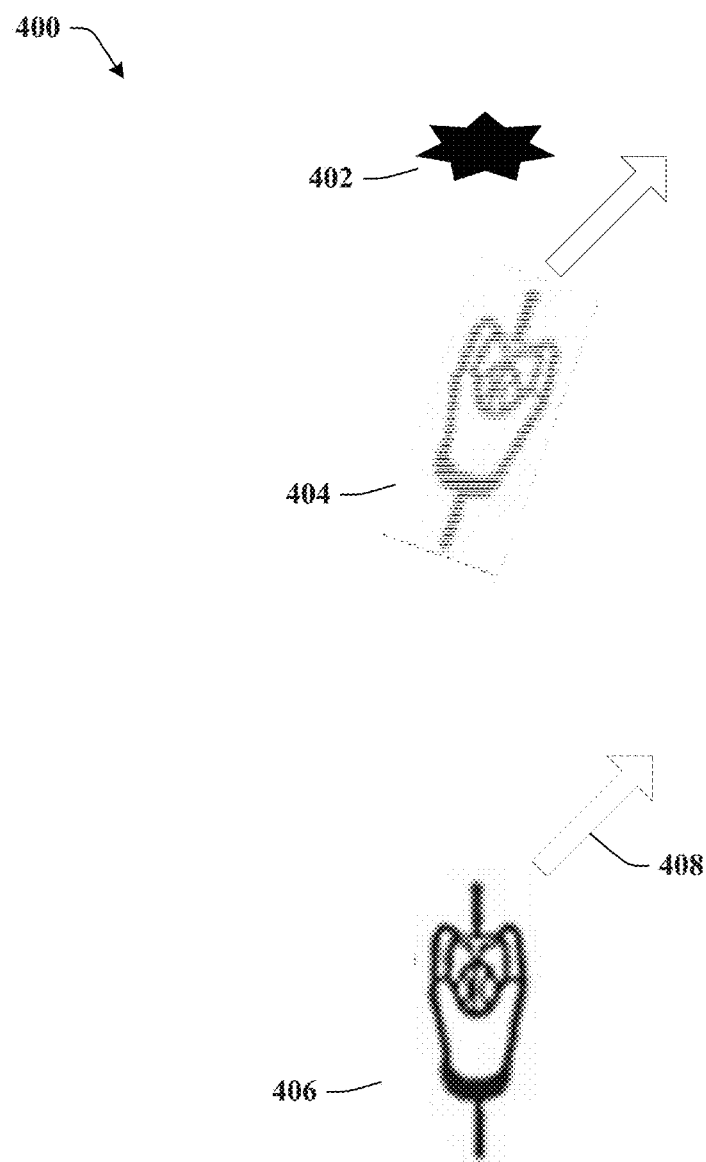
FIG. 4 illustrates an example cooperative intelligent traffic system in accordance with various aspects and embodiments of the subject disclosure.

Turning now to FIG. 4, illustrated is an example cooperative intelligent traffic system 400 in accordance with various aspects and embodiments of the subject disclosure. In the embodiment shown in FIG. 4, a rider 404 can dodge a hazard 402, and the sensor data can be transmitted to the network node (e.g., node 106 and associated MEC device 108), where the sensor feedback can be processed, and the results of the feedback can be sent to a device associated with rider 406. The alert or notification about the hazard 402 can also include a maneuver suggestion 408 to dodge or otherwise avoid hazard 402.

The maneuver 408 can be based on modeling the movement of the rider 404 based on the acceleration data and/or rangefinder data transmitted by a device associated with rider 404. For example, as rider 404 dodges the hazard 402 by veering to the right, the MEC device can interpret the acceleration data provided by a UE device or other sensor associated with rider 404 as a maneuver to dodge a hazard based on the level of acceleration (e.g., being above a predetermined threshold), based on the amount of deviation from a route or prior path, and based on other sensor data (range finder data, image data, etc.). The MEC device can then suggest a similar maneuver (e.g., maneuver 408) to rider 406 to avoid the hazard 402. The direction of the maneuver, the intensity of the maneuver, and other information can also be based on the sensor data received from rider 404.

Figure 5:
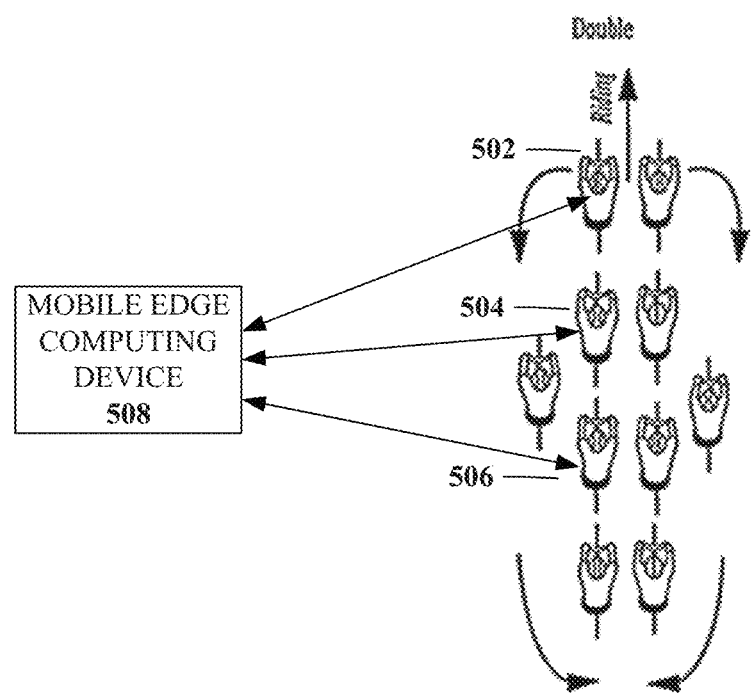
FIG. 5 illustrates an example cooperative intelligent traffic system in accordance with various aspects and embodiments of the subject disclosure.

Turning now to FIG. 5, illustrated is an example cooperative intelligent traffic system 500 in accordance with various aspects and embodiments of the subject disclosure. In the embodiment shown in FIG. 5, a paceline or peloton of bicyclists can be sending sensor data to a MEC device 508 and receive threat assessment data or other relevant information back from the MEC device 508. As an example, the MEC device 508 can receive sensor data from riders at the front of the paceline (e.g., rider 502) and send the threat assessment data to riders to the rear (e.g., riders 504 and 506). Similarly, the MEC device 508 can also receive sensor data from rider 504 and provide threat assessment data based on the sensor data from rider 504 to rider 506.

As the paceline changes, as rider 502 moves from the front to the back and rider 504 moves to the front, the MEC device 508 can detect these changes and adjust which sensor data is analyzed and delivered to the appropriate riders. For example, as rider 502 moves to the back, their sensor data is not as relevant as the sensor data from rider 504, and so MEC device 508 can primarily analyze sensor data from rider 504 to deliver threat assessments to riders 506 and 502.

The threat assessment data provided by MEC 508 can also include information about the path and other maneuvers by riders near the front to riders at the back, and does not have to relate to road obstructions or hazards. This can enable riders at the back to anticipate changes in directions to avoid accidents and other similar events. The threat assessment data can also include information about bicycle accidents near the front, as sensor data can be analyzed by MEC device 508 to detect accidents (sudden loss in speed, large acceleration etc.), and riders near the rear can be alerted to these accidents (audible message/tone, visual warning, augmented reality warning, etc.).

Figure 6:
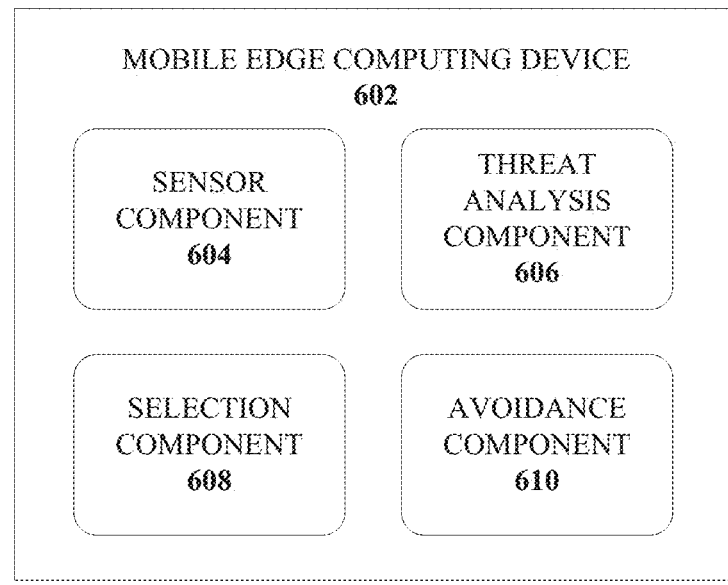
FIG. 6 illustrates an example multi-access edge computing device in accordance with various aspects and embodiments of the subject disclosure.

Turning now to FIG. 6, illustrated is an example multi-access edge computing system 600 in accordance with various aspects and embodiments of the subject disclosure.

The multi-access edge computing device 602 can be a hardware device housed at or near the base station device/ eNodeB/gNodeB (e.g., network node 106). In other embodiments, the multi-access edge computing device 602 can be a virtual machine instantiated at one or more computers at the base station device and be configured to analyze the sensor data and provide threat analysis feedback and other data to one or more bicycle riders.

Multi-access edge computing (MEC) is a network architecture concept that enables cloud computing capabilities and an IT service environment at the edge of the cellular network. The basic idea behind MEC is that by running applications and performing related processing tasks closer to the cellular customer, network congestion is reduced and applications perform better. MEC technology is designed to be implemented at the cellular base stations, and enables flexible and rapid deployment of new applications and services for customers. Combining elements of information technology and telecommunications networking, MEC also allows cellular operators to open their radio access network (RAN) to authorized third-parties, such as application developers and content providers.

The multi-access edge computing device 602 can include a sensor component 604 that receives sensor data from a first wireless device associated with a first bicycle or other vehicle. The sensor data can include at least one of location data representative of a location of the first wireless device, acceleration data representative of an acceleration of the first wireless device, speedometer data representative of a speed of the first wireless device, and distance measurement data representative of a distance between the first wireless device and the hazard. The sensor data can be received by cellular transmission, Wi-Fi, WiMax, or other radio frequency communication protocol.

The multi-access edge computing device 602 can also include a threat analysis component 606 that determines threat assessment data associated with a hazard to a second bicycle trailing the first bicycle based on the sensor data.

A selection component 608 can be provided to determine which UEs to send the threat assessment to. The selection of which devices have alerts sent to them by the selection component 608 can be a function of the location of the hazard, the size of the hazard (as determined by a camera or other sensor on the sensor device), and the location and traveling direction of the other UEs.

The selection component 608 can also determine to send data to UE based on group selection data associated with the UE. In an embodiment, the riders of the first bicycle associated with sensor device and the second bicycle associated with UE can be members of a group (e.g., a riding team, friends, etc.) and elect to share data with each other to improve the safety of the ride. The group selection can be made before the ride has started or during the ride. In other embodiments, the selection component 608 can determine to share data based on the proximity of the devices to each other. As an example, even if the bicyclists are not members of a group, but are otherwise riding near each other, the selection component 608 can determine the distance between the riders, and if it is less than a predetermined distance, the selection component 608 can automatically determine to share the data from a sensor device a particular UE. The proximity cutoff can be selected by either or both of the riders of UE and sensor device, or based on preference information associated with identity profiles of each device, or based on the speed of the devices. For instance, if the bicycles are traveling at a fast speed, the proximity can be larger so that the threat assessment can be provided with enough time for the rider to react and avoid the hazard.

An avoidance component 610 can be provided to suggest a maneuver or avoidance technique for a trailing bicycle to perform in order to avoid a road obstacle or the hazard. The maneuver can be based on modeling the movement of the rider based on the acceleration data and/or rangefinder data transmitted by a device associated with the rider. For example, as rider dodges the hazard by veering to the right, the avoidance component 610 can interpret the acceleration data provided by a UE device or other sensor associated with rider 404 as a maneuver to dodge a hazard based on the level of acceleration (e.g., being above a predetermined threshold), based on the amount of deviation from a route or prior path, and based on other sensor data (range finder data, image data, etc.). The avoidance component 610 can then suggest a similar maneuver (e.g., maneuver) to rider to avoid the hazard. The direction of the maneuver, the intensity of the maneuver, and other information can also be based on the sensor data received from rider.

Figure 7:
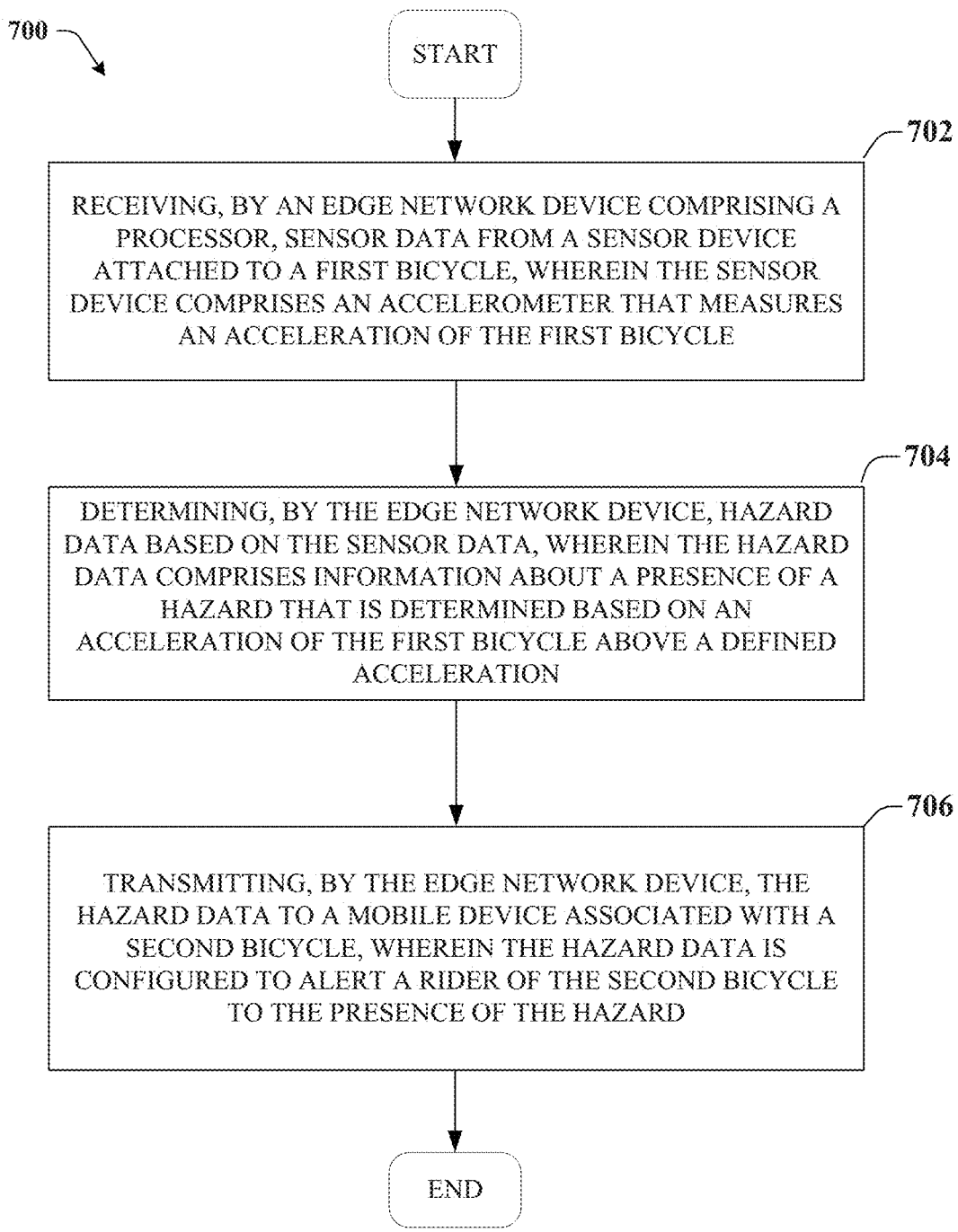
FIG. 7 illustrates an example method for facilitating a cooperative intelligent traffic system in accordance with various aspects and embodiments of the subject disclosure.
Figure 8:
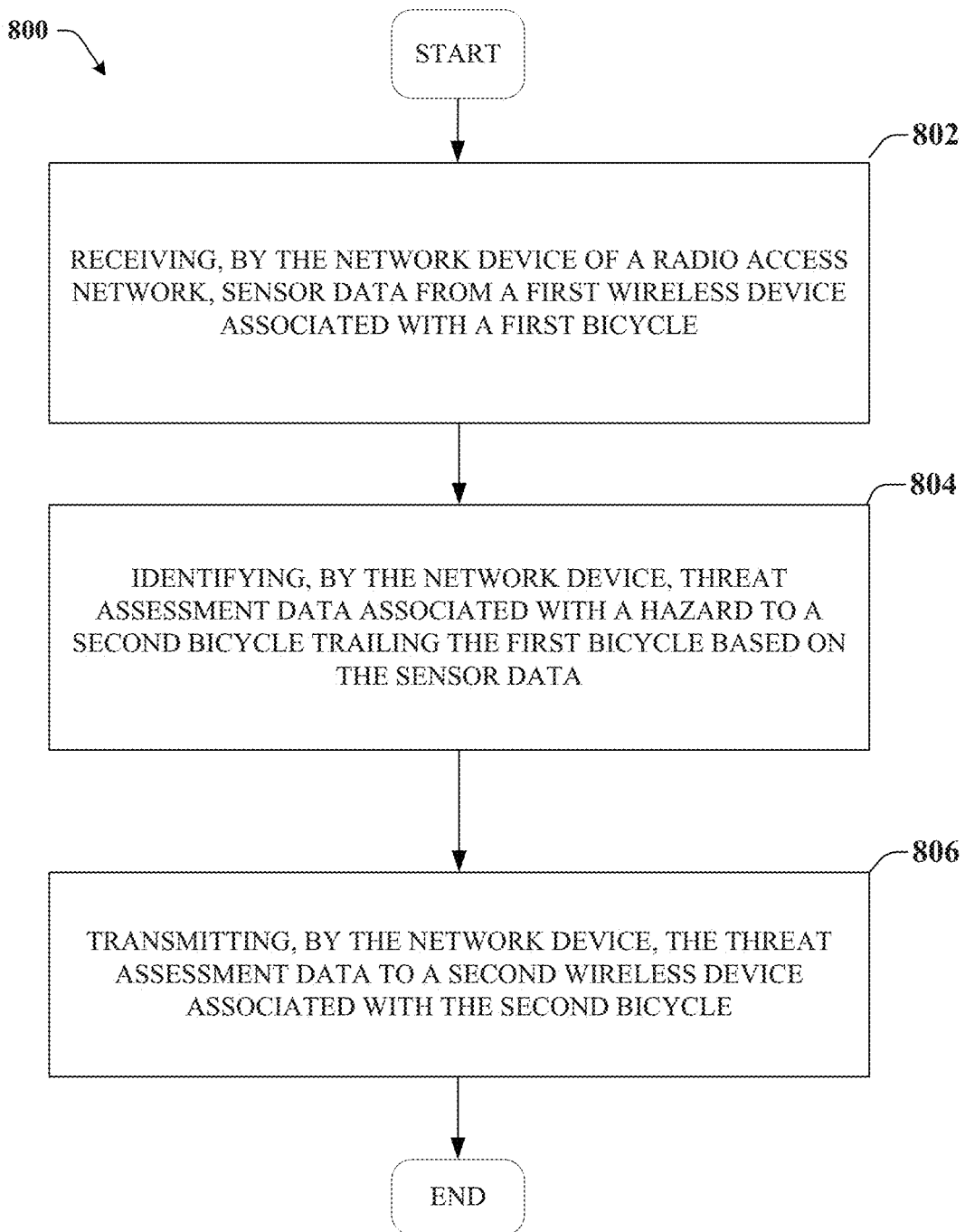
FIG. 8 illustrates an example method for facilitating a cooperative intelligent traffic system in accordance with various aspects and embodiments of the subject disclosure.

FIGS. 7-8 illustrates a process in connection with the aforementioned systems. The processes in FIGS. 7-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for facilitating a cooperative intelligent traffic system in accordance with various aspects and embodiments of the subject disclosure.

Method 700 can begin at 702 where the method includes receiving, by an edge network device comprising a processor, sensor data from a sensor device attached to a first bicycle, wherein the sensor device comprises an accelerometer that measures an acceleration of the first bicycle.

At 704, the method includes determining, by the edge network device, hazard data based on the sensor data, wherein the hazard data comprises information about a presence of a hazard that is determined based on an acceleration of the first bicycle above a defined acceleration.

At 706, the method includes transmitting, by the edge network device, the hazard data to a mobile device associated with a second bicycle, wherein the hazard data is configured to alert a rider of the second bicycle to the presence of the hazard.

FIG. 8 illustrates an example method 700 for facilitating a cooperative intelligent traffic system in accordance with various aspects and embodiments of the subject disclosure.

Method 800 can begin at 802 wherein the method includes receiving, by the network device of a radio access network, sensor data from a first wireless device associated with a first bicycle.

At 804, the method can include identifying, by the network device, threat assessment data associated with a hazard to a second bicycle trailing the first bicycle based on the sensor data.

At 806, the method can include transmitting, by the network device, the threat assessment data to a second wireless device associated with the second bicycle.

Figure 9:
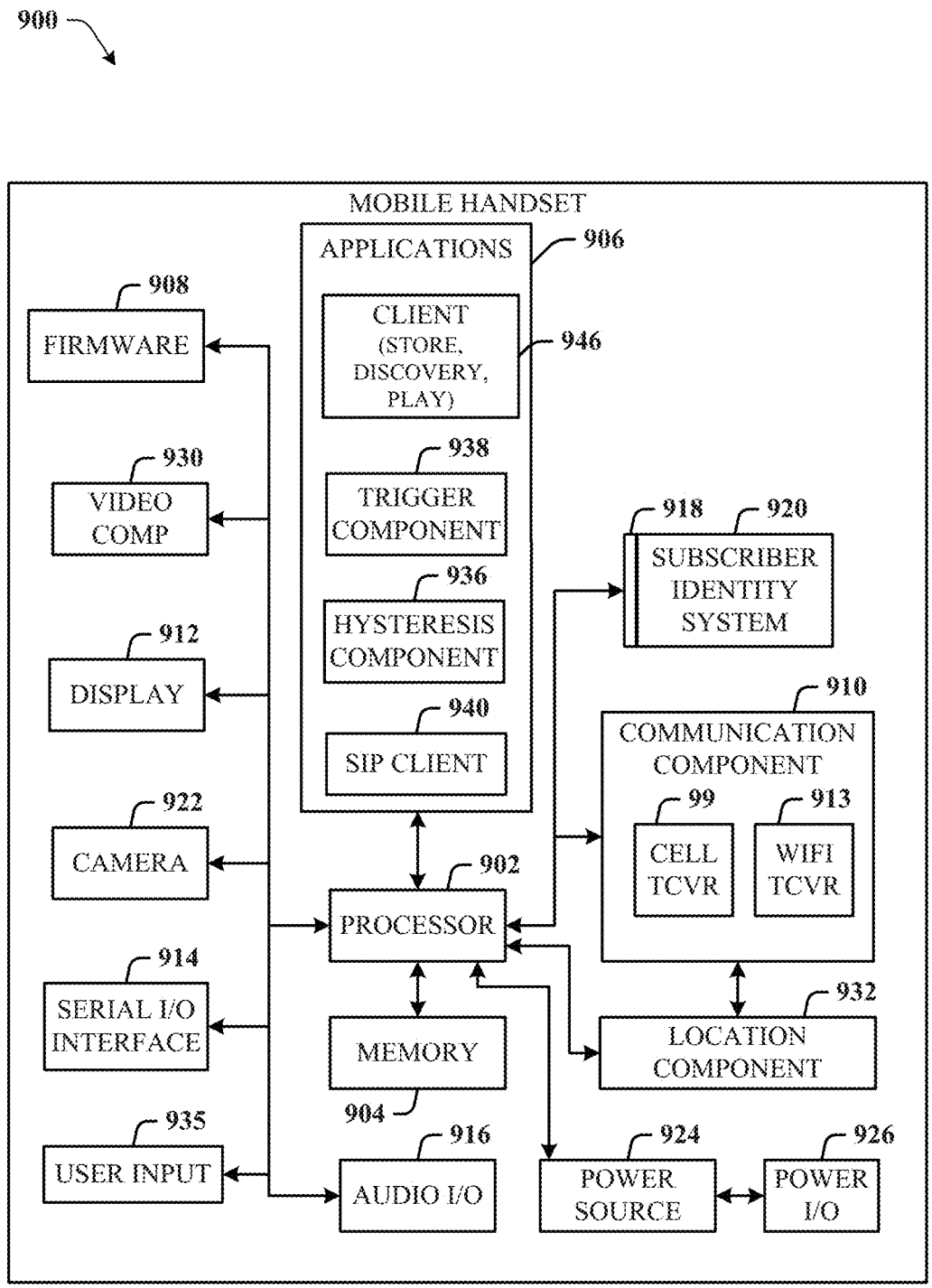
FIG. 9 illustrates an example block diagram of an example user equipment that can be a mobile handset operable to provide sensor data and receive threat information in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on.

Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
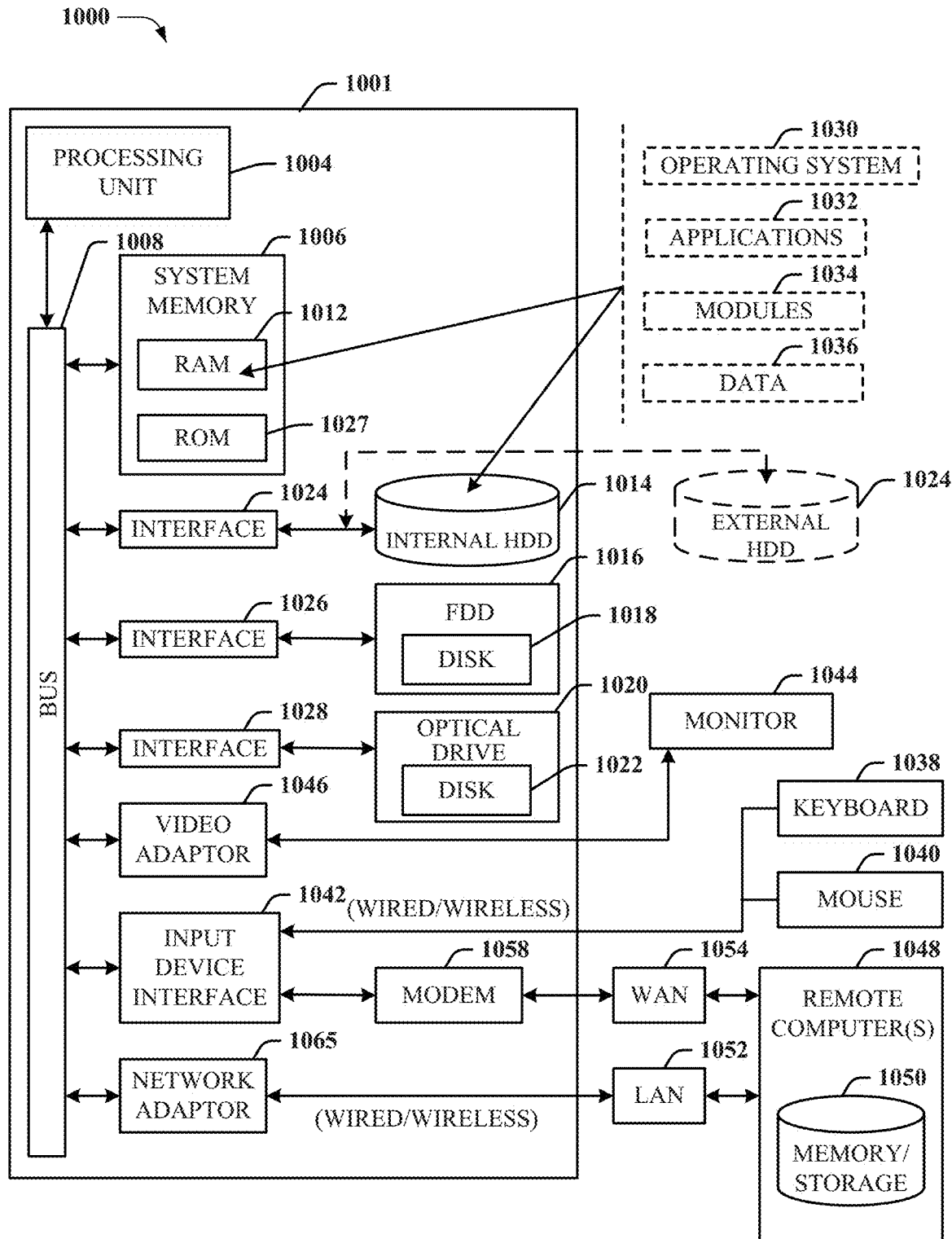
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, network node 206, e.g.,) or multi-access edge computing device 108, 208, etc., may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows:

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106, gNB 202, e.g.,) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
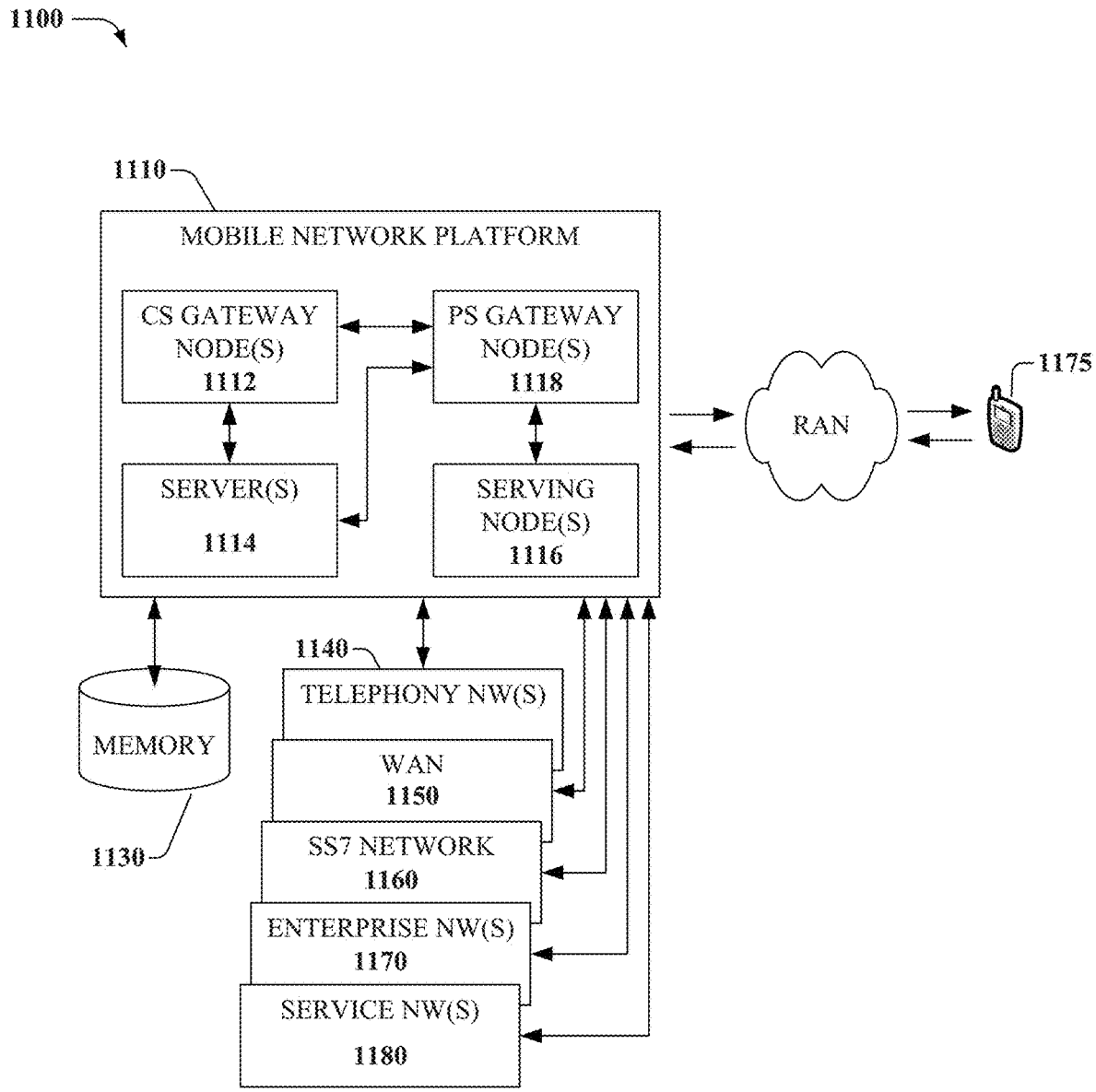
FIG. 11 illustrates an example block diagram of a non-limiting embodiment of a mobile network platform in accordance with various aspects described herein

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice)

arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   selecting, by network equipment comprising a processor, second bicycles in a defined area relative to a first bicycle in motion, wherein a size of the defined area is selected based on a speed of the motion of the first bicycle;
   receiving, by network equipment comprising a processor, respective sensor data from the second bicycles in the defined area;
   determining, by the network equipment, a threat to the first bicycle based on first sensor data from a second bicycle of the second bicycles within the defined area; and
   transmitting, by the network equipment, an alert of the threat to a user equipment associated with the first bicycle.

2. The method of claim 1, wherein the defined area is in front of the first bicycle in a direction of the motion of the first bicycle.

3. The method of claim 1, wherein the size of the defined area increases as the speed of the motion of the first bicycle increases.

4. The method of claim 1, wherein determining the threat to the first bicycle based on the first sensor data comprises determining a level of acceleration of the second bicycle indicated in the first sensor data that is indicative of the threat.

5. The method of claim 1, wherein determining the threat to the first bicycle based on the first sensor data comprises determining a level of braking of the second bicycle indicated in the first sensor data that is indicative of the threat.

6. The method of claim 1, wherein determining the threat to the first bicycle based on the first sensor data comprises determining a sideways motion of the second bicycle indicated in the first sensor data that is indicative of the threat.

7. The method of claim 1, wherein the first sensor data comprises image data of the threat, and the alert comprises a graphical display of the image data.

8. Network equipment, comprising:
   a processor; and
   a memory that stores executable instructions that, when executed by the processor, facilitate performance of operations, comprising:
   selecting second motorized cycles in a defined area relative to a first motorized cycle in motion, wherein a size of the defined area is selected based on a speed of the motion of the first motorized cycle;
   examining respective sensor data from the second motorized cycles in the defined area;

determining a threat to the first motorized cycle based on first sensor data from a second motorized cycle of the second motorized cycles within the defined area; and communicating a notification of the threat to a user equipment associated with the first motorized cycle.

9. The network equipment of claim 8, wherein the defined area is in front of the first motorized cycle in a direction of the motion of the first motorized cycle.

10. The network equipment of claim 8, wherein the size of the defined area changes proportionally to the speed of the motion of the first motorized cycle.

11. The network equipment of claim 8, wherein determining the threat to the first motorized cycle based on the first sensor data comprises determining a level of acceleration of the second motorized cycle indicated in the first sensor data that is indicative of the threat.

12. The network equipment of claim 8, wherein determining the threat to the first motorized cycle based on the first sensor data comprises determining a level of braking of the second motorized cycle indicated in the first sensor data that is indicative of the threat.

13. The network equipment of claim 8, wherein determining the threat to the first motorized cycle based on the first sensor data comprises determining a lateral threat as a result of a sideways motion of the second motorized cycle indicated in the first sensor data that is indicative of the threat.

14. The network equipment of claim 8, wherein the first sensor data comprises image data corresponding to the threat, and the notification comprises a graphical display of the image data.

15. A non-transitory machine-readable medium, comprising executable instructions that, when executed by a processor of network equipment, facilitate performance of operations, comprising:

selecting second vehicles in a defined area relative to a first vehicle in motion, wherein a size of the defined area is selected based on a speed of the motion of the first vehicle;

analyzing respective sensor data from the second vehicles in the defined area;

determining a threat to the first vehicle based on first sensor data from a second vehicle of the second vehicles within the defined area; and sending a warning of the threat to a user equipment associated with the first vehicle.

16. The non-transitory machine-readable medium of claim 15, wherein the defined area is in front of the first vehicle in a direction of the motion of the first vehicle.

17. The non-transitory machine-readable medium of claim 15, wherein the size of the defined area increases with velocity increases of the first vehicle.

18. The non-transitory machine-readable medium of claim 15, wherein determining the threat to the first vehicle based on the first sensor data comprises determining a level of acceleration of the second vehicle indicated in the first sensor data that is indicative of the threat.

19. The non-transitory machine-readable medium of claim 15, wherein determining the threat to the first vehicle based on the first sensor data comprises determining a level of braking of the second vehicle indicated in the first sensor data that is indicative of the threat.

20. The non-transitory machine-readable medium of claim 15, wherein determining the threat to the first vehicle based on the first sensor data comprises determining a lateral motion of the second vehicle indicated in the first sensor data that is indicative of the threat, and wherein a direction of the lateral motion is perpendicular or substantially perpendicular to a direction of the first vehicle.

* * * * *